US007675196B2

(12) United States Patent
Kimura

(10) Patent No.: US 7,675,196 B2
(45) Date of Patent: Mar. 9, 2010

(54) POWER SUPPLY APPARATUS AND IMAGE FORMING APPARATUS

(75) Inventor: Yoshihisa Kimura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 344 days.

(21) Appl. No.: 11/758,372

(22) Filed: Jun. 5, 2007

(65) Prior Publication Data

US 2007/0280720 A1 Dec. 6, 2007

(30) Foreign Application Priority Data

Jun. 6, 2006 (JP) ............................ 2006-156968

(51) Int. Cl.
*H02J 5/00* (2006.01)

(52) U.S. Cl. .......................................... 307/52; 714/22

(58) Field of Classification Search .................. 307/52, 307/53; 713/320, 340, 300; 714/22, 2; 363/74
See application file for complete search history.

(56) References Cited

U.S. PATENT DOCUMENTS 5,583,751 A * 12/1996 Nakazawa et al. ............ 363/20
5,825,155 A * 10/1998 Ito et al. ..................... 320/118
5,831,412 A * 11/1998 Morioka et al. ............. 320/106
7,129,674 B2 * 10/2006 Ichinose et al. ............. 320/101
7,233,081 B2 * 6/2007 Tokuda ........................ 307/52
7,385,831 B2 * 6/2008 Ito et al. .................. 363/21.09
2007/0200432 A1 8/2007 Yano et al.

FOREIGN PATENT DOCUMENTS

JP 2004-236492 8/2004
JP 2005-221674 8/2005

OTHER PUBLICATIONS

U.S. Appl. No. 11/758,372, filed Jun. 5, 2007, Kimura.

* cited by examiner

*Primary Examiner*—Albert W Paladini
(74) *Attorney, Agent, or Firm*—Oblon, Spivak, McClelland, Maier & Neustadt, L.L.P

(57) ABSTRACT

A circuit unit connects outputs from a first power supply and a second power supply in parallel, and simultaneously supplies powers from both power supplies to a load. A control unit controls an output current from the first power supply to an upper-limit value or lower, and controls an output current from the second power supply to a value obtained by subtracting the upper-limit value from a current detected by a current detector. An abnormality detector detects an abnormality in simultaneously supplied power, based on a reference current value associated with an operating state of the power supply apparatus and the current detected by the current detector.

11 Claims, 14 Drawing Sheets

POWER SUPPLY APPARATUS AND IMAGE FORMING APPARATUS

CROSS-REFERENCE TO RELATED APPLICATIONS

The present document incorporates by reference the entire contents of Japanese priority document, 2006-156968 filed in Japan on Jun. 6, 2006.

BACKGROUND OF THE INVENTION

1. Field of the Invention

The present invention relates to a power supply apparatus provided with an auxiliary power supply in addition to a power supply that uses externally-supplied power in a steady state. The auxiliary power supply has a power storage device and a power supply circuit that uses electric power from the power storage device as a power source. More particularly, the present invention relates to, although the example is not intended to limit the invention, a power supply apparatus that supplies electric power stored in a power storage device to a direct current (DC) load when a large amount of power is required by entire equipment, thereby leveling power consumption by the equipment so as not to exceed an amount of available commercial alternating current (AC) power. Examples applications of the invention include a power supply apparatus, a printer, a copier, and a facsimile that supplies backup power when power supply from the outside is disrupted, supplies high-load power exceeding a maximum capacity of the externally-supplied power, or levels power consumption of the externally-supplied power.

2. Description of the Related Art

In recent years, a copier, a printer, a facsimile each utilizing an electrophotographic process, and a multifunction product having two or more functions thereof have been increased in versatility, which has increased the complexity of the products and thereby increasing maximum power consumption.

Power supply to a fixing heater has been increased in amount to reduce factors inherent to an image forming apparatus, such as a warm-up time of a fixing unit or a suspension time due to a drop in the temperature of the fixing heater during a printing or copying operation, or to reduce a waiting time of a user. However, electric power available from a normal power supply line is limited in its amount. This constitutes a large restriction on apparatus design. Japanese Patent Application Laid-open No. 2004-236492 describes a power supply apparatus and an image forming apparatus devised for not exceeding a maximum available power of a power supply line. To achieve this, power consumption is predicted. When the thus-predicted power consumption exceeds a maximum available power of a main power supply, the apparatus supplies power to some of loads while switching power source therefor between the main power supply and an auxiliary power supply using a switching circuit.

Japanese Patent Application Laid-open No. 2005-221674 describes an image forming apparatus that uses a constant voltage power supply circuit as an auxiliary power supply, and sets an output voltage therefrom higher than an output voltage from a main power supply. A first diode for preventing backflow of power to the main power supply is provided on a power supply line from the main power supply to the load, and a switch or a second diode is provided on the power supply line at a point between the first diode and the load. The output voltage from the auxiliary power supply is applied to the load via the first diode, and the switch or the second diode. In a period in which the output voltage from the auxiliary power supply is higher than the output voltage from the main power supply, power is supplied to the load only from the auxiliary power supply.

However, according to the conventional techniques, the power storage device uses a constant-voltage power supply as the power output circuit; that is, as the power supply circuit for the load. Hence, when power supply source is switched between an AC/DC power supply (main power supply), which is a constant-voltage power supply, and an auxiliary power supply, which is also a constant-voltage power supply, voltage undesirably fluctuates due to a difference between two output voltages from the constant-voltage power supplies. The irregular rotation of the motor can result in an anomalous image formed by the image forming apparatus. For example, when the apparatus is a color image forming apparatus, the irregular rotation can cause color misregistration.

Information on Prior Application

The present inventors have proposed a power supply apparatus that supplies electric power to a load. The apparatus includes: a first power supply that supplies a constant voltage by using externally-supplied electric power as a power source; a second power supply that has a power storage device and supplies a constant current by using electric power of the storage device as a power source; a circuit unit that connects an output from the first power supply and an output from the second power supply to the load in parallel, thereby simultaneously supplying electric power from both the first power supply and the second power supply to the load; a current detector that detects a load current value, which is a value of an electric current supplied to the load; and a control unit that controls an output current from the first power supply to within an indicated maximum value, and controls an output current from the second power supply to a value obtained by subtracting the indicated maximum value from the load current value detected by the current detector (Japanese Patent Application Laid-Open No. 2006-49221, filed on Feb. 24, 2006). According to the technique, power is supplied to the load from the first and second power supplies simultaneously. This eliminates the need of switching between the two power supplies, thereby suppressing voltage fluctuation due to the switching.

In the apparatus, detection of the current supplied to the load and indication of a current to be supplied to the second power supply are implemented via analog circuit units. When an abnormality occurs in the circuit units, power consumption by the power supply apparatus can increase to exceed a rated power, and cause a voltage drop or the like of commercial power source from which power is supplied to the power supply apparatus.

SUMMARY OF THE INVENTION

It is an object of the present invention to at least partially solve the problems in the conventional technology.

A power supply apparatus according to another aspect of the present invention includes a first power supply that outputs a constant voltage using an externally supplied power as an input source; a second power supply that outputs a constant current using a power charged in a capacitor as an input source; a circuit unit that connects an output from the first power supply and an output from the second power supply in parallel, and simultaneously supplies a power from the first power supply and a power from the second power supply to a load; a current detector that detects a current supplied to the load; a control unit that controls an output current from the first power supply to equal to or lower than an upper-limit value, and controls an output current from the second power supply to a value obtained by subtracting the upper-limit value from the current detected by the current detector; a residual power detector that detects a residual power of the capacitor; and an abnormality detector that estimates the residual power of the capacitor according to an operating state of the power supply apparatus and detects an abnormality in simultaneously supplied power, based on detected residual power and estimated residual power.

A power supply apparatus according to still another aspect of the present invention includes a first power supply that outputs a constant voltage using an externally supplied power as an input source; a second power supply that outputs a constant current using a power charged in a capacitor as an input source; a circuit unit that connects an output from the first power supply and an output from the second power supply in parallel, and simultaneously supplies a power from the first power supply and a power from the second power supply to a load; a first current detector that detects a current supplied to the load; a control unit that controls an output current from the first power supply to equal to or lower than an upper-limit value, and controls an output current from the second power supply to a value obtained by subtracting the upper-limit value from the current detected by the current detector; a second current detector that detects the output current from the second power supply; and an abnormality detector that detects an abnormality in simultaneously supplied power, based on the output current from the second power supply detected by the second current detector, the upper-limit value, and the current detected by the first current detector.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a power supply apparatus and an image forming apparatus according to the present invention are explained in detail below with reference to the accompanying drawings.

Figure 1:
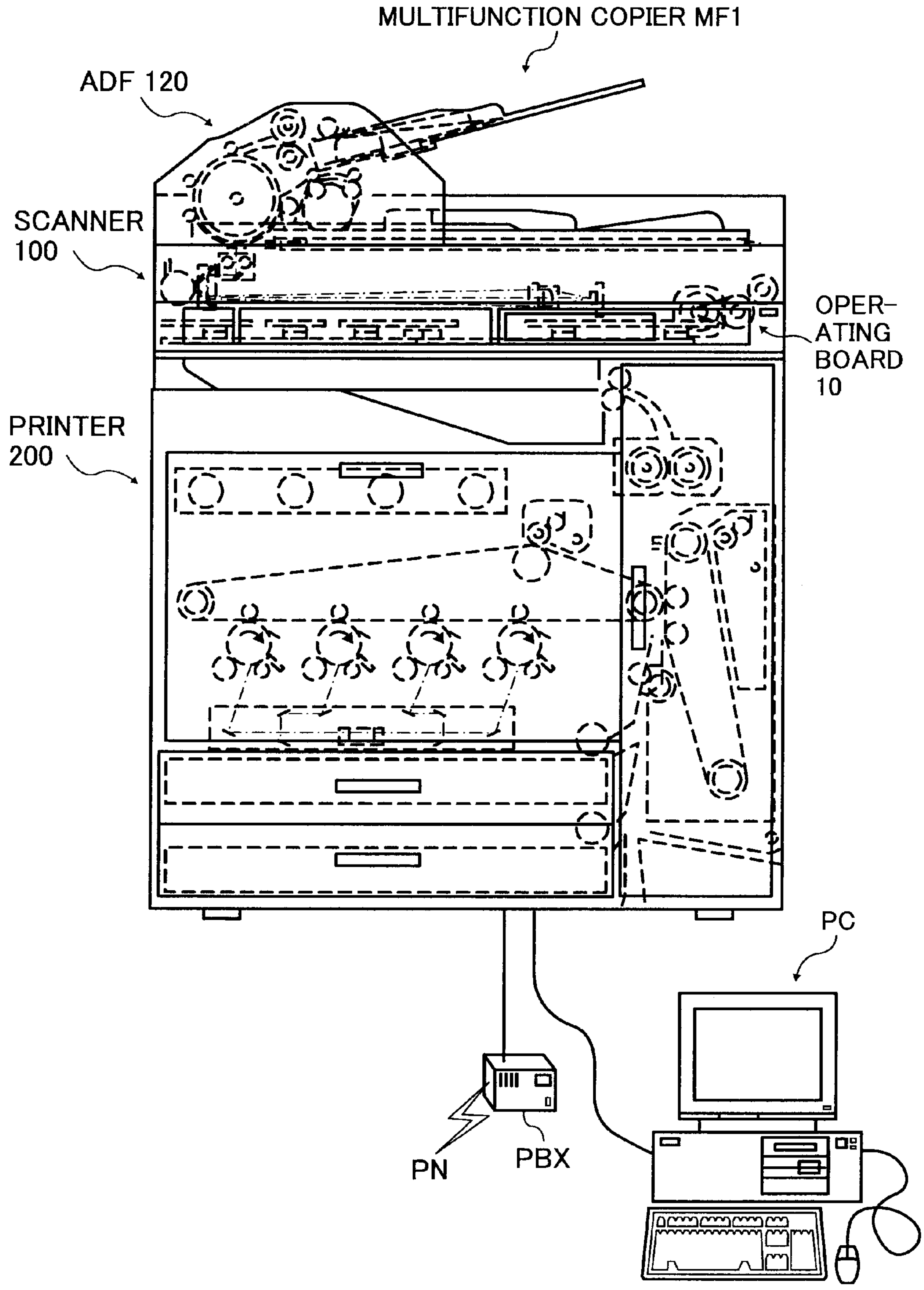
FIG. 1 is a front view of an external appearance of a multifunction copier according to a first embodiment of the present invention.

FIG. 1 is an external view of a full-color digital multifunction copier MF1 according to a first embodiment of the present invention. The full-color copier MF1 principally includes an automatic document feeder (ADF) 120, an operating board 10, a color scanner 100, and a color printer 200. Each of the operating board 10 and the scanner 100 provided with the ADF 120 is separable from the printer 200. The scanner 100, provided with a control board, reads a document image based on timing control performed by an engine controller with which the scanner 100 communicates directly or indirectly. The control board has a power device driver, a sensor input receiver, and a controller.

Figure 2:
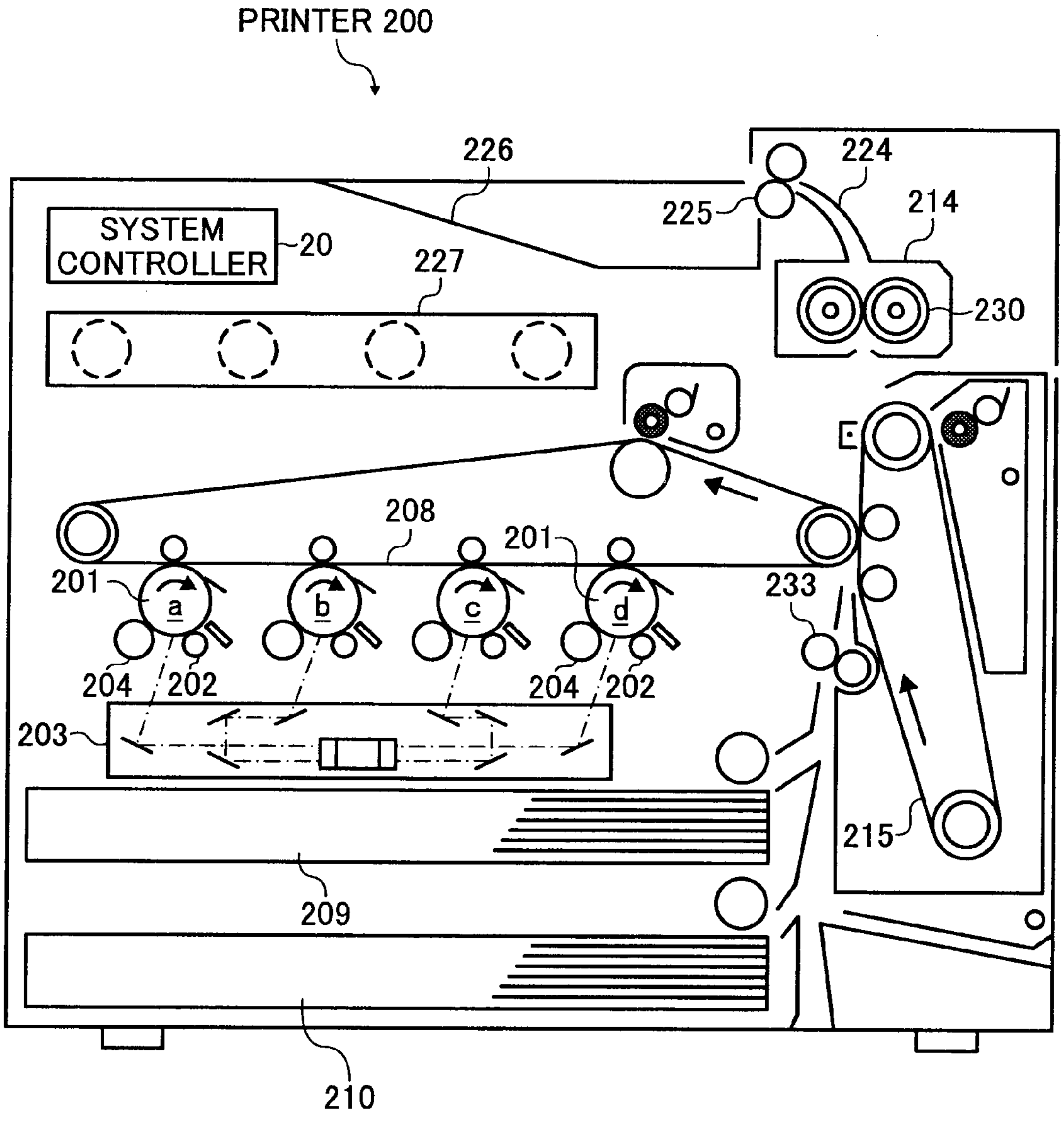
FIG. 2 is an enlarged vertical cross-section of a color printer shown in FIG. 1.

FIG. 2 depicts the mechanism of the printer 200 in the multifunction copier MF1. The printer 200 according to the first embodiment is a laser printer. The printer 200 has four toner-image forming units "a" to "d" arranged in this order along a moving direction (from left to right in FIG. 2) of a primary transfer belt 208. Each toner-image forming unit forms an image of a corresponding color among magenta (M), cyan (C), yellow (Y), and black (K). In other word, the printer 200 is a full-color image forming apparatus of a four-drum type (tandem type). A discharger, a cleaning unit, a charger 202, and a developing unit 204 are disposed around each of photosensitive members 201 that is rotatably supported for rotation in the direction indicated by arrow. A space is ensured between the charger 202 and the developing unit 204 for allowing a light signal emitted from an exposing device 203 to enter. The photosensitive member 201 are provided in the number of four (a, b, c, and d). The photosensitive members 201 are identical in configuration of image forming components provided therearound, but different in a color of a color material (toner) processed by the developing unit 204. Each of the four photosensitive members 201 is partially in contact with the primary transfer belt 208. As the photosensitive member, a belt-type photosensitive member can alternatively be employed.

The primary transfer belt 208 is supported on and stretched by support rollers and a drive roller that rotate to be movable in the direction indicated by arrow. A primary transfer roller is provided, on the backside of the primary transfer belt 208 (inner side of the belt loop), to be adjacent to each photosensitive member 201. A cleaning unit for the primary transfer belt is provided on an external side the belt loop. After the primary transfer belt 208 has transferred a toner image to a transfer sheet (paper) or to a secondary transfer belt, the cleaning unit removes unnecessary residual toner on the surface of the primary transfer belt 208. The exposing device 203 of a known laser type irradiates a uniformly charged surface of each photosensitive member with light signals for forming a full-color image to form a latent image. The exposing device can alternatively be formed with a light emitting diode (LED) array and an image forming unit.

With reference to FIG. 2, a secondary transfer belt 215 is provided on the right of the primary transfer belt 208. The primary transfer belt 208 and the secondary transfer belt 215 contact each other to form a predetermined transfer nip area. The secondary transfer belt 215 is supported on and stretched by support rollers and a drive roller to be movable in the direction indicated by arrow. A secondary transfer unit 117 is provided on the backside of the secondary transfer belt 215 (inner side of the belt loop). A cleaning unit for the secondary transfer belt, a charger, and the like are provided on the external side of the belt loop. After an image is transferred from the secondary transfer belt to a sheet, the cleaning unit removes unnecessary residual toner on the belt. The transfer sheet (paper) is stored in paper feed cassettes 209 and 210 in a lower portion of the printer 200 of FIG. 2. An uppermost sheet, one sheet at a time, is delivered to registration rollers 233 through a plurality of paper guides. A fixing unit 214, a paper discharge guide 224, paper discharge rollers 225, and a sheet discharge stack 226 are provided above the secondary transfer belt 215. A container 227 capable of containing toner for replenishment is disposed at a position above the primary transfer belt 208, under the sheet discharge stack 226. Four color toners: magenta, cyan, yellow, and black are provided in the form of each color cartridge. The toner is supplied to the developing unit 204 of a corresponding color by a powder pump or the like as required.

An operation of each element during double-sided printing will be explained below. First, the photosensitive member 201 forms an image. More specifically, the exposing device 203 causes light emitted from an laser diode (LD) light source (not shown) to impinge on the photosensitive member 201 of the image forming unit "a" among the photosensitive members 201 each uniformly charged by the corresponding charger 202 through an optical component (not shown), to thereby form a latent image corresponding to image data (image data for each color) on the photosensitive member 201. The latent image on the photosensitive member 201 is developed with the toner by the developing unit 204, and the thus-formed visible image is held on the surface of the photosensitive member 201. The primary transfer unit transfers the toner image to the surface of the primary transfer belt 208 that moves in synchronization with the photosensitive member 201. The surface of the photosensitive member 201 on which residual toner remains is cleaned by the cleaning unit, and subjected to discharging performed by the discharger to prepare for a next image forming cycle. The primary transfer belt 208 carries the toner image transferred to its surface and moves in the direction indicated by arrow. A latent image for another color is formed on the surface of the photosensitive member 201 of the image forming unit "b", and developed with toner of the corresponding color into a visible image. The image is superimposed on the visible image of the already-formed color image on the primary transfer belt 208 to thus superimpose four-color images on the primary transfer belt 208 eventually. Alternatively, a monochrome image can be formed. The secondary transfer unit 117 transfers the images formed on the formed on the surface of the primary transfer belt 208 to the surface of secondary transfer belt 215 having been moved in the direction indicated by arrow in synchronization with the primary transfer belt 208. Thus, an image is formed by moving the primary transfer belt 208 and the secondary transfer belt 215 while forming images on the photosensitive members 201 of the tandem-type four image forming units "a" to "d", which allows accelerating image forming time. When the primary transfer belt 208 has moved to a predetermined position, the photosensitive member 201 forms a toner image to be formed on the other side of the sheet in the same procedure described above, and paper feeding is started. The uppermost sheet in the paper feed cassette 209 or 210 is pulled out and delivered to the registration rollers 233. The secondary transfer unit 117 transfers the toner image on the surface of the primary transfer belt 208 to one side of the sheet having been fed to between the primary transfer belt 208 and the secondary transfer belt 215 through the registration rollers 233. The recording medium is further upwardly delivered to a position at which the toner image on the surface of the secondary transfer belt 215 is transferred to the other side of the sheet. This transfer process is performed while controlling delivery timing of the sheet so that the image is accurately positioned on the sheet.

The sheet on both sides of which the toner images have been transferred in the transfer process is sent to the fixing unit 214. The fixing unit 214 fuses and fixes the toner images (both sides) on the sheet at a time. The sheet is then sent through the paper discharge guide 224 and discharged by the paper discharge rollers 225 to the sheet discharge stack 226 provided in an upper portion of a main body frame. When the components 224 to 226 form the paper discharge section as shown in FIG. 2, the sheet is placed on the sheet discharge stack 226 with the side (page) of the sheet on which an image is transferred after the other side; that is, the side to which the image is directly transferred from the primary transfer belt 208 facing down. Hence, to collate pages, an image for a second page is formed first, and a toner image thereof is held on the secondary transfer belt 215, while directly transferring an image for a first page to the sheet from the primary transfer belt 208. Exposure is performed such that the image to be directly transferred to the sheet from the primary transfer belt 208 is formed as a normal image on the surface of the photosensitive member, while forming the toner image to be transferred to the sheet by way of the secondary transfer belt 215 as an inverted image (mirror image) on the surface of the photosensitive member. Such determination of a sequence for image formation to collate pages and image processing of switching between a normal image formation and an inverted image (mirror image) formation are performed by controlling reading/writing of image data from/to memory through the controller. After the image has been transferred from the secondary transfer belt 215 to the sheet, the cleaning unit that includes a brush roller, a collecting roller, and a blade removes unnecessary toner and paper dust remaining on the secondary transfer belt 215.

FIG. 2 depicts a state in which the brush roller of the cleaning unit for the secondary transfer belt 215 is away from the surface of the secondary transfer belt 215. The brush roller is pivotable about its support and capable of coming into contact with and separating from the surface of the secondary transfer belt 215. The brush roller is separated from the secondary transfer belt 215 during a period from a time when the toner image is carried on the secondary transfer belt 215 to a time when the toner image is transferred to the sheet yet. When cleaning of the secondary transfer belt 215 is required, the brush roller is pivoted counterclockwise in FIG. 2. The removed toner is collected into a toner container. The image forming process to be performed when a double-sided printing mode is selected by setting to a "double-sided transfer mode" has been described. When the double-sided printing is selected, printing is invariably performed following the image forming process.

There are two single-sided printing modes: a "single-sided transfer by the secondary transfer belt 215" and a "single-sided transfer mode performed by the primary transfer belt 208". When the former mode of transferring an image using the secondary transfer belt 215 is selected, a visible image formed on the primary transfer belt 208 by superimposing three or four colors or that on the primary transfer belt 208 formed with a monochrome black is transferred to the secondary transfer belt 215, and further transferred to one side of a sheet. Image transfer is not performed on the other side of the sheet. In this mode, a printed side of a printed sheet discharged into the sheet discharge stack 226 faces up. When the latter mode of transferring an image using the primary transfer belt 208 is selected, a visible image formed on the primary transfer belt 208 by superimposing three or four colors or that on the primary transfer belt 208 formed with a monochrome black is not transferred to the secondary transfer belt 215, but transferred to transferred to one side of a sheet. Image transfer is not performed on the other side of the sheet. In this mode, a printed side of a printed sheet discharged into the sheet discharge stack 226 faces down.

Figure 3A:
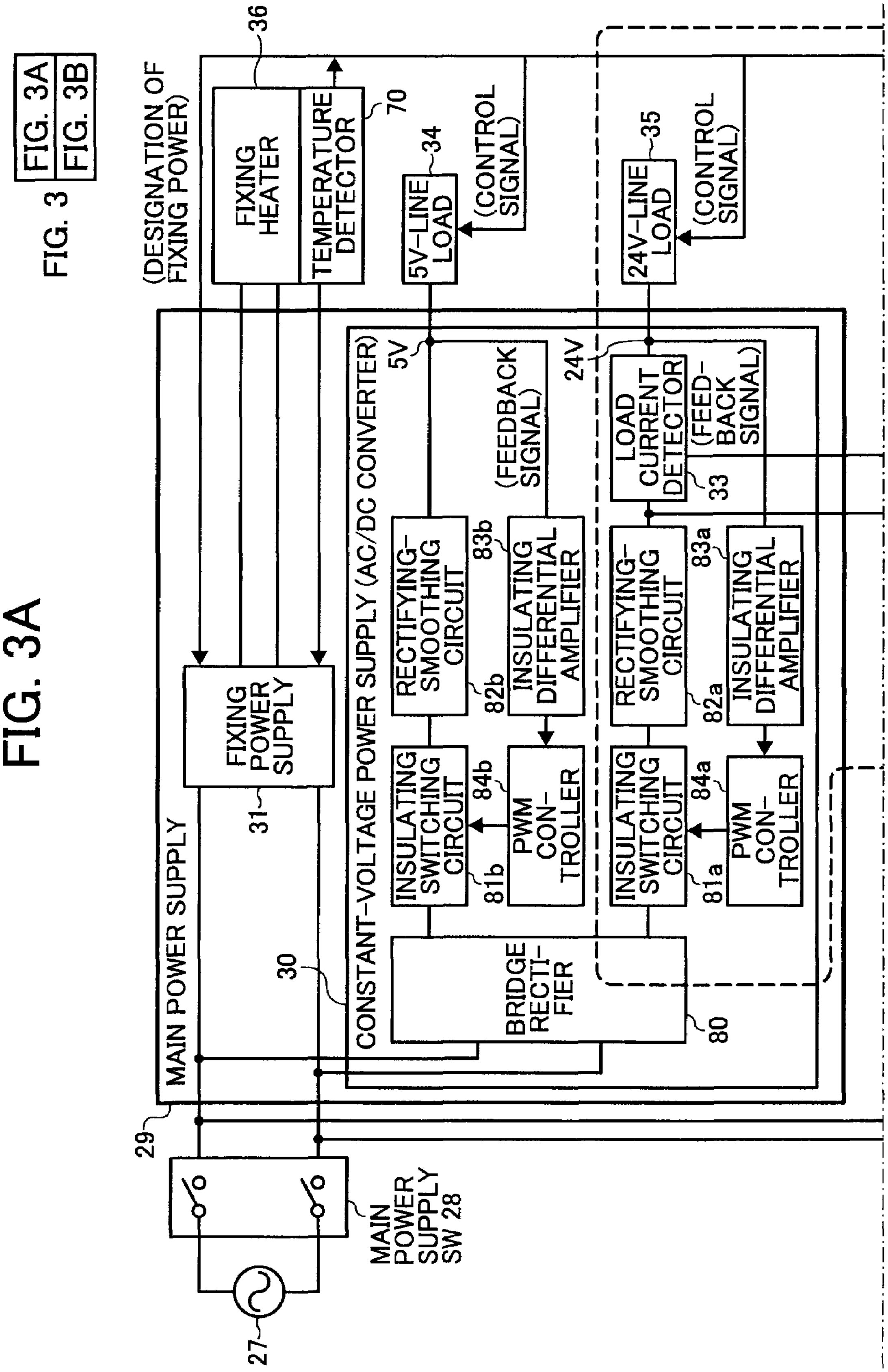
FIG. 3 is a block diagram of a power supply apparatus of the multifunction copier shown in FIG. 1.
Figure 3B:
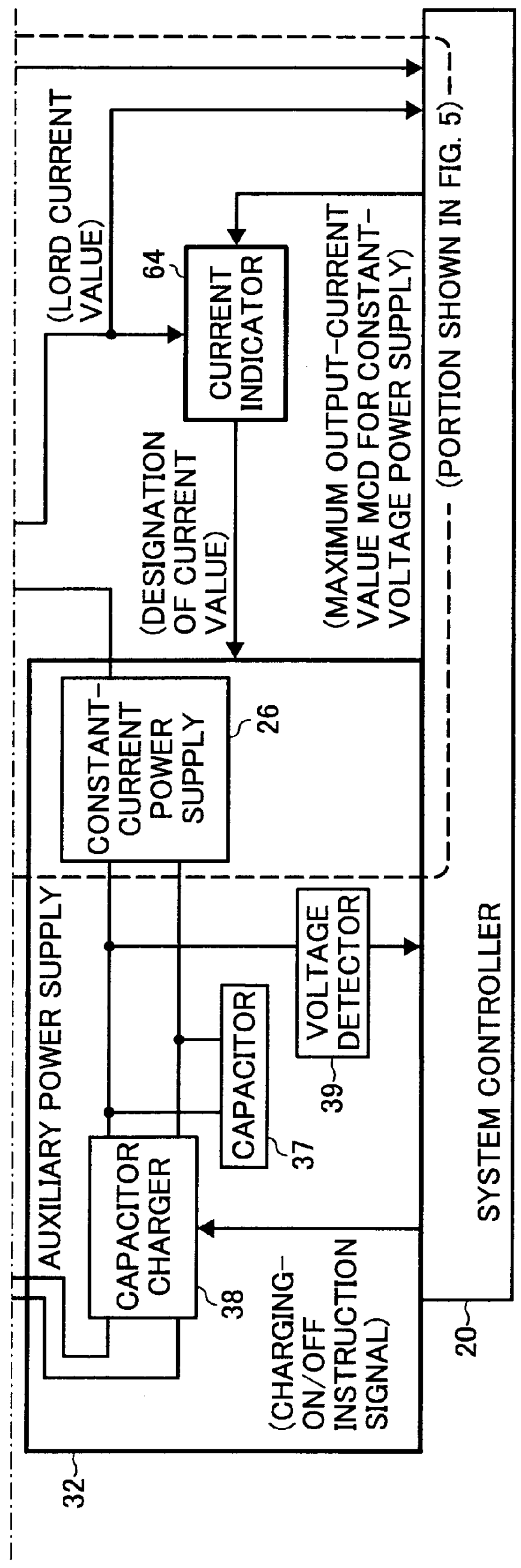

FIG. 3 depicts a power supply apparatus, provided in the copier shown in FIG. 1, which supplies electric power for elements in the copier. When a main power-supply switch 28 is turned on, commercial alternating current (AC) power is supplied to a main power supply 29 and an auxiliary power supply 32. A commercial AC voltage is applied from the commercial AC power supply to a fixing power supply 31 and a constant-voltage power supply 30, which are included in an AC control circuit, and a capacitor charger 38 in the auxiliary power supply 32. The fixing power supply 31 performs feedback control of a temperature of the fixing unit using a fixing temperature signal supplied from a temperature detector 70. The control is performed within a power range indicated by a power indicating signal provided from a system controller 20.

The constant-voltage power supply 30, which is a first power supply of the main power supply 29, converts commercial AC through a bridge rectifier 80, an insulating switching circuit 81*a*, 81*b*, and a rectifying-smoothing circuit 82*a*, 82*b* into DC. The constant-voltage power supply 30 performs constant-voltage feedback control using a detected voltage signal, which is provided to a pulse-width modulation (PWM) controller 84*a*, 84*b* through an insulating differential amplifier 83*a*, 83*b*. Hence, two DC constant voltages; that is, 5-volt DC and 24-volt DC, are generated and supplied to a 5-volt line load 34 and a 24-volt line load 35, respectively. A detected voltage signal (feedback signal) taken from the 24-volt line represents a voltage at a point downstream (the side closer to the load) of a load current detector 33. The load-current detector 33 includes a current detecting resistor 60 (FIG. 5) of several milliohms serially connected to a power supply line. If the load-current detector 33 is provided downstream of the point at which the detected voltage signal (feedback signal) is taken, a power supply voltage to be supplied to the system undesirably fluctuates. For example, when a resistor of 10 milliohms is connected to a current detecting resistor of the load-current detector 33, changing a load from 5 amperes to 15 amperes causes the power supply voltage to change by 0.1 volt (=10 milliohms×(15 A−5 A)). Furthermore, when a current detecting resistor of the load-current detector 33 is added to the outside of the main power supply 29, the voltage will fluctuate by a larger degree due to wiring resistance. In the first embodiment, to prevent addition of a current detecting resistor causes power supply voltage for a DC load to fluctuate, a voltage taken at a point downstream of the current detecting resistor 60 (FIG. 5) is subjected to feedback control so that the voltage attains a target voltage (predetermined value).

The auxiliary power supply 32 according to the first embodiment includes the capacitor charger 38, a capacitor 37 to be charged by the capacitor charger 38, and a constant-current power supply 26, or a second power supply, that supplies constant current from the capacitor to a supply line to the 24V-line load 35. The auxiliary power supply 32 supplies power to the 24V-line load 35 because an increase in the amount of power supplied to a fixing heater 36 needs to be supplemented by the auxiliary power supply 32. More specifically, the auxiliary power supply 32 is required to supply electric power to a power supply line that consumes power of an amount equal to or greater than that of power to be supplemented by the auxiliary power supply 32. Hence, according to the first embodiment, in view of an increase (e.g., 300 watts) in an amount of power supplied to the fixing heater 36 of the fixing unit 214, the auxiliary power supply 32 supplies power to the 24V-line load 35 (e.g., 500 watts) that consumes a greater amount of electric power than the 5V-line load 34 (e.g., 100 watts). When the increase in the amount of power supplied to the fixing heater 36 is small, or when the 5V-line load 34 consumes a large amount of power, the auxiliary power supply 32 can alternatively supply power to the 5V-line load 34.

The load-current detector 33 detects a 24V-line load current value, which is a sum of current values simultaneously supplied from the constant-voltage power supply 30 (first power supply) and the constant-current power supply 26 (second power supply), and provides a detected current signal to a current indicator 64. The system controller 20 provides the current indicator 64 with maximum-current indicating data MCD that indicates a maximum output-current value for the constant-voltage power supply 30. The current indicator 64 provides the constant-current power supply 26 with a current indicating signal that indicates a value (i.e., an indicated output-current value for the constant-current power supply 26) obtained by subtracting the indicated maximum value from the 24V-line load current value. The constant-current power supply 26 supplies constant current from the capacitor 37 to the 24V-line load supply line under a constant-current control that is performed for attaining a target current value indicated by the current indicating signal.

The capacitor 37 in the auxiliary power supply 32 is a large-capacitance capacitor, such as an electric double-layer capacitor. Although the capacitor 37 can be an element selected from various capacitors other than the electric double-layer capacitor, according to the first embodiment, an electric double-layer capacitor that can charge/discharge in a short period of time and has a long usable life is employed. A feature of electric double-layer capacitors lies in that, as the capacitor discharges electricity, a terminal voltage at the capacitor (hereinafter, "capacitor voltage") decreases. Hence, the constant-current power supply 26 is provided downstream of the capacitor 37 so that a predetermined current value is output irrespective of fluctuation in the capacitor voltage.

Figure 4:
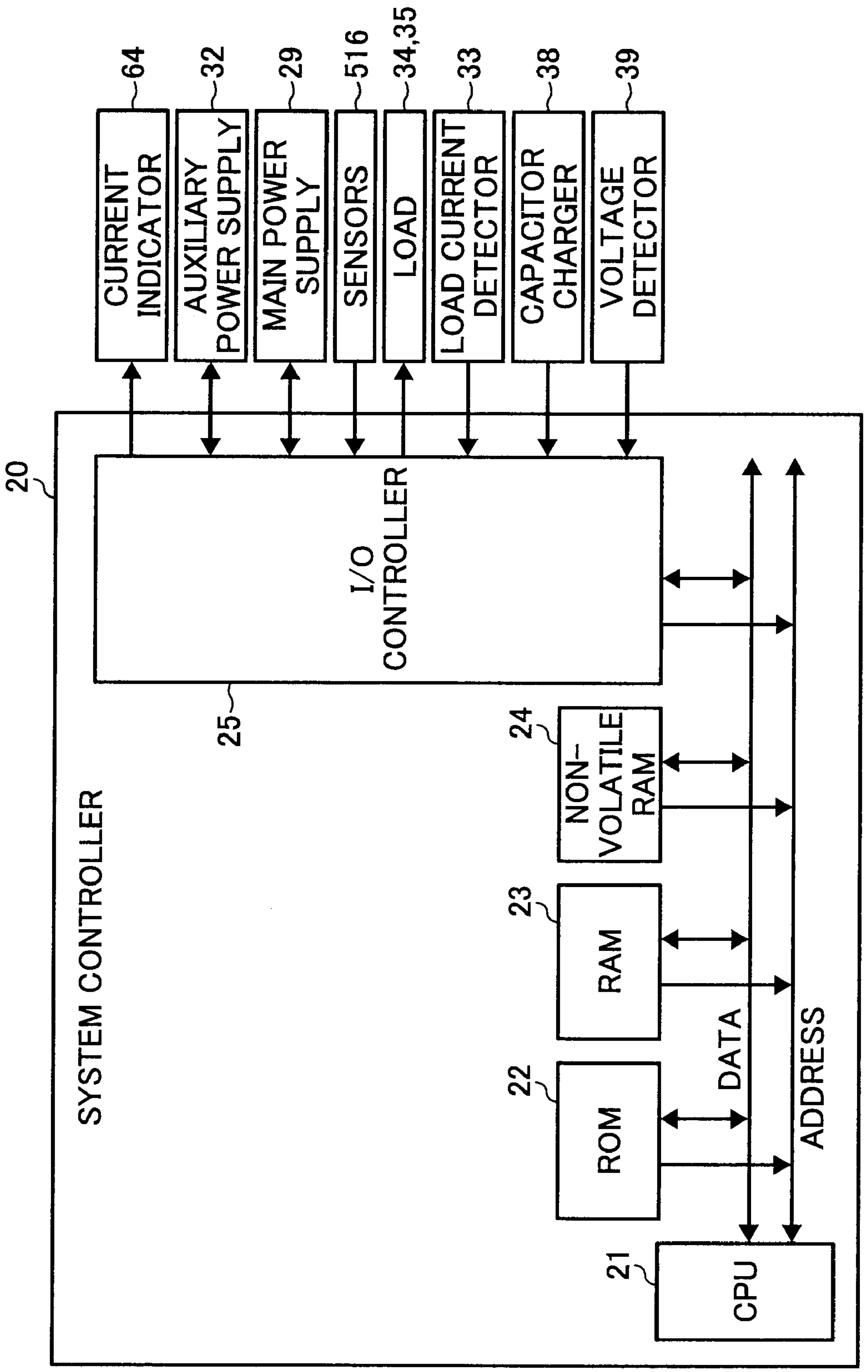
FIG. 4 is a block diagram of a schematic configuration of a system controller shown in FIG. 3.

FIG. 4 is a configuration diagram of the system controller 20 depicted in FIG. 3. The system controller 20 has a central processing unit (CPU) 21, a read only memory (ROM) 22, a random access memory (RAM) 23, a nonvolatile RAM 24, and an input/output (I/O) controller 25. The CPU 21 controls detection of an amount of power stored in the capacitor in the capacitor and a load current, inputs/outputs to/from sensors and loads, and power supply according to a control instruction provided from the engine controller (not shown), a program stored in the ROM 22, and a program and data stored in the nonvolatile RAM 24. The ROM 22 stores programs for operating the CPU 21. The RAM 23 is used as work memory for the CPU 21. The nonvolatile RAM 24 stores power consumption table that contains data on working conditions of the loads and power consumption in each operating mode, and a printing time table that contains time data on periods of time required for performing printing in each operating state. The I/O controller 25 controls reading of data input from sensors 516 and driving of each load 35 in the full-color digital multifunction copier MF1. In the system controller 20, the charge level of the capacitor and a detected load current signal are processed by the CPU 21 via the I/O controller 25. Alternatively, the controller can be configured to cause the same to be processed by the CPU 21 without involvement of the I/O controller 25.

The system controller 20 controls inputs/outputs to/from the sensors and loads and power supply according to instructions issued for engine control on reading an image, process control on printing, copying, and the like, control for performing an abnormality-handling process, and sequence control. The system controller 20 causes the loads to operate sequentially according to a corresponding operating mode. The system controller 20 also controls charging and discharging of the capacitor 37, and causes power to be supplied to the 24V-line load 35 from the accumulated electricity in the capacitor 37 during a startup period of the apparatus and for a predetermined duration thereafter. Simultaneous therewith, the system controller 20 increases an amount of power supplied to the fixing heater 36 with a surplus of power supplied from the AC power-supply line 27.

Figure 5:
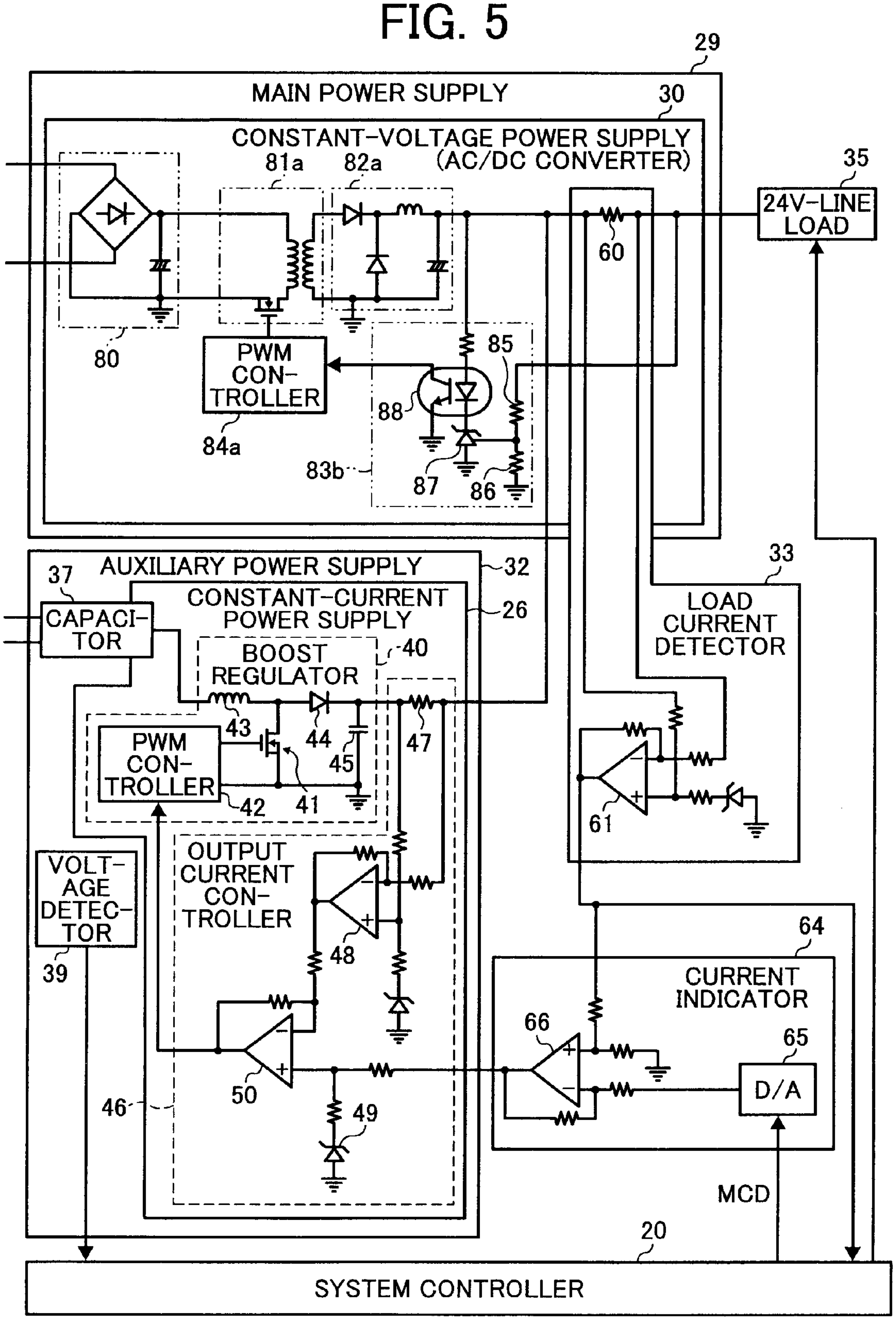
FIG. 5 is an electric circuit diagram of configurations of a constant-current power supply, a load current detector, and a current indicator shown in FIG. 3.

FIG. 5 depicts a detailed configuration of the constant-voltage power supply 30, the constant-current power supply 26, the load-current detector 33, and the current indicator 64 depicted in FIG. 3. A voltage at the downstream side (the side closer to the DC load 35) of the current detecting resistor 60, which is included in the load-current detector 33, is divided through dividing resistors 85 and 86 into the detected voltage signal. In the constant-voltage power supply 30, the detected voltage signal is compared with a reference voltage and amplified through a shunt regulator 87, and isolated by a photo coupler 88. The signal is thereafter provided to the PWM controller 84*a* as the voltage feedback signal. Thus, voltage-regulating feedback control is performed on a power supply voltage at the point immediately before a 24V-line load.

According to the first embodiment, the capacitor 37 is an electric double-layer capacitor. Electric double-layer capacitors have low withstand voltages, and a maximum charge voltage in actual use is 2.5 volts. Hence, it is necessary to connect a plurality of electric double-layer capacities in series to attain a high voltage. Note that the same capacitance is attained at a lower cost by connecting a smaller number of large-capacitance capacitors than connecting a large number of small-capacitance capacitors. When the capacitor 37 is formed with nine or a smaller number of electric double-layer capacitors, the maximum charge voltage is equal to or lower than 22.5 volts. Therefore, to supply power to a 24V-line load, a boost regulator must be included in the constant-current power supply 26. According to the first embodiment, constant-current power is output from the capacitor 37 after being raised in voltage level through a boost regulator 40.

A semiconductor switch 41 of the boost regulator 40 is conducting (turned on) during a high (H) period of an output PWM pulse of a PWM controller 42, whereas the semiconductor switch 41 is nonconducting (turned off) during a low (L) period of the same. When the semiconductor switch 41 is conducting, electric current flows from the capacitor 37 to a reactor 43 and to the semiconductor switch 41, thereby accumulating electric charges in the reactor 43. When the semiconductor switch 41 is turned off into the nonconducting state, the accumulated electricity in the reactor 43 exhibits a high voltage, and charges a capacitor 45 through a diode 44 at a high voltage. As the semiconductor switch 41 repeats switching of ON and OFF according to a PWM duty ratio, a voltage at the capacitor 45 increases. Hence, power is supplied to the 24V-line load 35 through a current detecting resistor 47 and the current detecting resistor 60 in the load-current detector 33.

The load-current detector 33 amplifies a potential difference across the current detecting resistor 60 through a differential amplifier 61, generates a load current signal that is proportional to a load current value, and supplies (applies) the signal to the current indicator 64.

The current indicator 64 performs digital-to-analog (D/A) conversion of the maximum-current indicating data MCD provided from the system controller 20 into a maximum-value indicating signal (voltage) through a D/A converter 65, subtracts the maximum-value indicating signal from the detected load value, and supplies the subtraction result, which is a voltage differential, to the constant-current power supply 26 as a current indicating signal. More specifically, the current indicator 64 obtains the differential value by subtracting the maximum output-current value of the constant-voltage power supply 30 indicated by the system controller 20 from the detected 24V-line load current value as a target value of electric current to be supplied from the constant-current power supply 26, and instructs the constant-current power supply 26 to supply current of an amount of the target value.

The constant-current power supply 26 amplifies a potential difference across the current detecting resistor 47 through a differential amplifier 48, generates an output current signal that is proportional to an output current value, and supplies the signal to a differential amplifier 50. The differential amplifier 50 amplifies the output current signal by a differential between the signal and the target current value provided from the current indicator 64, and further includes a voltage provided from a bias circuit thereto. The thus-obtained signal is provided to the PWM controller 42 as a duty-ratio indicating signal for PWM pulses.

The PWM controller 42 sets the duty ratio indicated by the duty-ratio indicating signal as the duty ratio for the PWM pulses according to which the semiconductor switch 41 is turned on and off. In other words, as the output signal of the current indicator 64 is increased and hence an output voltage of the differential amplifier 50 is increased, a duty ratio of the PWM pulses is increased, which leads to an increase in an output current value of the boost regulator 40. This increases a degree of voltage drop at the current detecting resistor 47, and raises a level of the detected output-current signal, thereby decreasing the output voltage from the differential amplifier 50, and lowering the duty ratio of the PWM pulses. This decreases an output current value of the boost regulator 40. According to such a feedback PWM control, the output current of the boost regulator 40 attains a value, which is provided from the current indicator 64, equivalent to the differential between the maximum output-current value MCD of the constant-voltage power supply 30 indicated by the system controller 20 and the detected 24V-line load current value.

The current detecting resistor 60 of the load-current detector 33 is included in the constant-voltage power supply 30 (main power supply 29), and mounted on the same substrate as the constant-voltage power supply 30. The current detecting resistor 60 is connected to the differential amplifier 61 of the load-current detector 33 via resistors pertaining to the differential amplifier 61 and the like through connectors and harnesses. The differential amplifier 61 is provided on a substrate different from that of the constant-voltage power supply (main power supply). A voltage across the current detecting resistor 60 is used as an interface signal between the substrates. This configuration allows to minimize deterioration in output accuracy of the constant-voltage power supply 30 that can be otherwise caused by lengthening (extending) a constant-voltage feedback loop of the constant-voltage power supply 30. That is, an increase in cost due to causing the constant-voltage power supply 30 to be adapted to remote sensing can be suppressed.

According to the configuration, when the auxiliary power-supply system is to be included as an option, the auxiliary power supply 32, the current indicator 64, and the differential amplifier 61 including the resistors pertaining thereto of the load-current detector 33 can easily be removed from the main system (main power supply 29) without changing the main system depending on presence/absence of the auxiliary power-supply system. Hence, the cost of the main system (main power supply 29) increases only by the cost for the current detecting resistor 60, and the main system can be configured to be adaptable to connection of the auxiliary power-supply system with a minimal increase in cost.

When the main power-supply apparatus is not to be modified depending on presence/absence of the auxiliary power-supply system, power is consumed by the current detecting resistor also in the apparatus to which the auxiliary power-supply system is not connected. For example, power consumption of a system, to which a resistor of 10 milliohms is connected and of which load during an operation is 15 amperes, is 2.25 watts. During a standby period with a light load, the power consumption attains a further smaller value than the above. However, to eliminate the power consumption, a jumper line can be connected in place of the current detecting resistor 60, which requires only a slight modification, and prevents the main system (main power supply 29) from being complicated. In addition, cost for the main system (main power supply 29) to which the auxiliary power-supply system is not connected can be further reduced.

Alternatively, the main power supply can be configured such that the entire load-current detector 33 including the differential amplifier 61, with resistors and the like pertaining thereto, is included in the constant-voltage power supply 30 (main power supply 29), and mounted on the same substrate as the constant-voltage power supply 30. The load-current detector 33 is connected to the current indicator 64 on a substrate different from that of the constant-voltage power supply 30 (main power supply 29) through connectors and harnesses, and a load current signal output from the differential amplifier 61 is used as an interface signal between the substrates. According to this configuration, the cost for the main power supply increases to be higher than that of the above configuration by the cost for the differential amplifier 61 and the resistors pertaining thereto. Not only essentially the same effect is yielded as that yielded by the foregoing configuration, but also exchanging amplified signals allows to increase a noise withstand. In other words, stability of current-detecting performance is increased. An overview of changes in an output current of the constant-current power supply 26 will be described below.

Figure 6A:
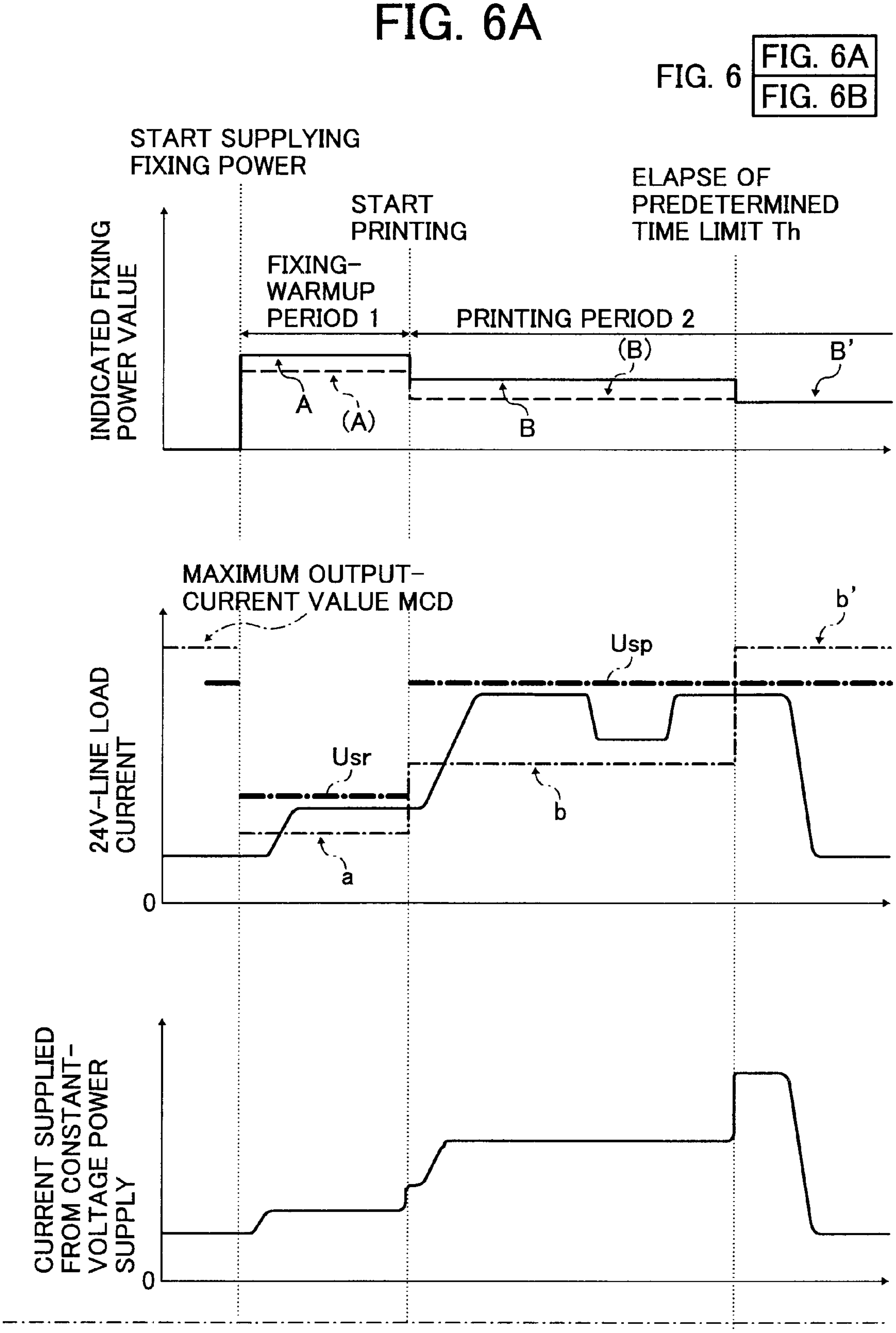
FIG. 6 is a time chart of relations among an indicated fixing power value, a 24-volt line maximum-output-current value from a constant-voltage power supply, a current (load current) for a load, a 24-volt-line output current from the power supply, and an AC input power for the power supply apparatus under power supply control performed by the system controller.
Figure 6B:
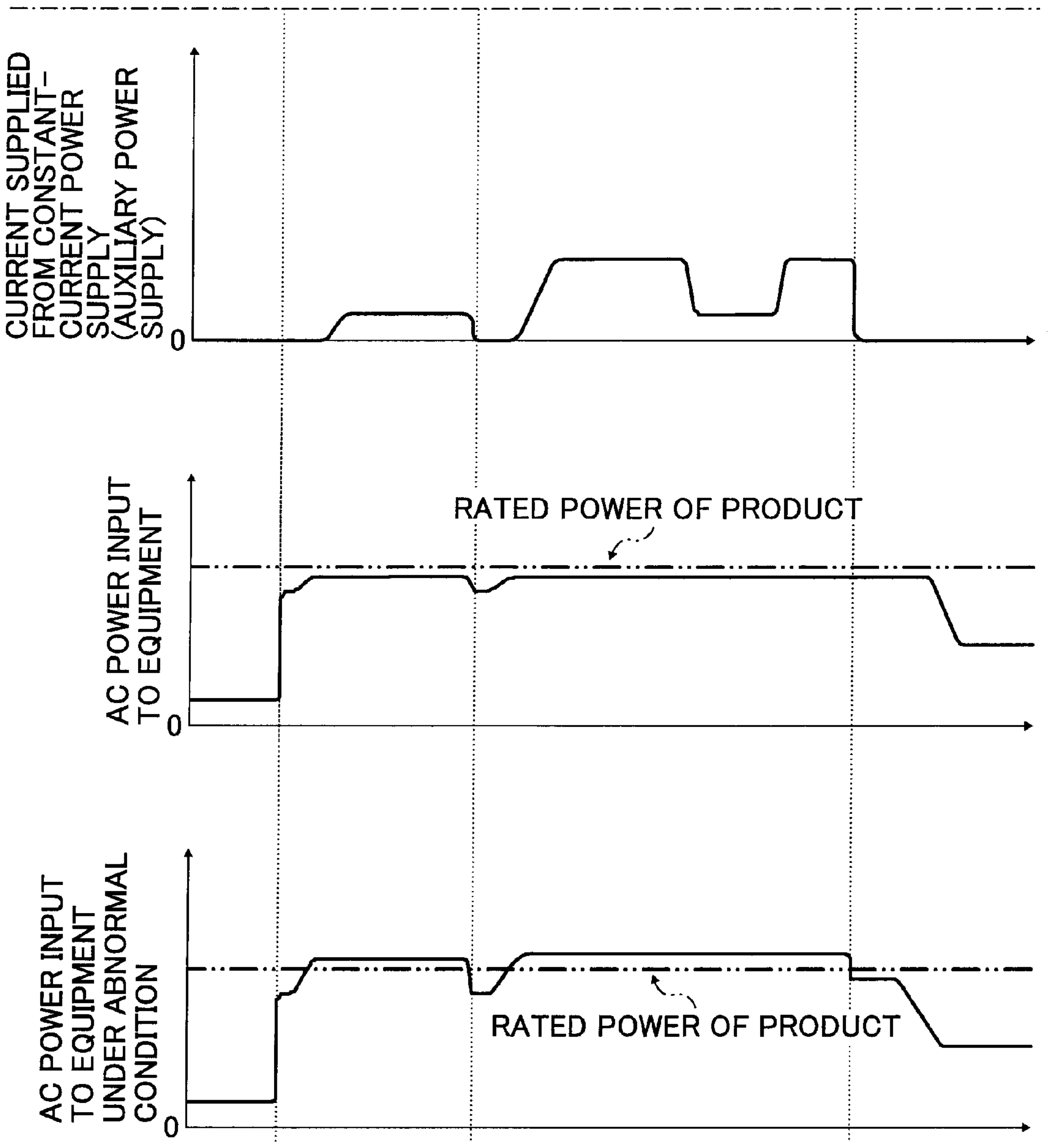

FIG. 6 is a graph of changes in an indicated fixing-power value, a 24V-line load current, a supply current to the constant-voltage power supply, a supply current to the constant-current power supply, and input power to equipment, each taken from a startup of the apparatus. Letters inside the parentheses denote line segments in FIG. 6, and numerical values are example set power values.

The system controller 20 starts time measurement for a time limit Th from a start of a warmup-for-fixing period (hereinafter, "fixing-warmup period") (1), over which the temperature of the fixing heater 36 is increased from that of immediately after switch-on of the main power-supply switch 28 to a target temperature. Meanwhile, the "fixing-warmup" is an operation to increase the temperature of the fixing heater 36 to a temperature at which printing is available. Within a period in which the measured time does not reach Th, power is supplied from the auxiliary power supply 32 to the load 35. When the measured time reaches the time limit Th, power supply from the auxiliary power supply 32 to the load 35 is stopped. Supplying power from the auxiliary power supply 32 to the load 35 reduces the accumulated charges in the capacitor 37. Therefore, a printing operation (including a copying operation) is finished to recharge the capacitor 37 in duration until receiving a subsequent instruction for printing.

Within the fixing-warmup period (1), a greater amount of power (A: 1300 watts) than usual is supplied to the fixing heater 36 to attain a warm-up time required of the apparatus so that the fixing heater 36 is heated to a temperature at which printing is available as early as possible. In the fixing-warmup period, the system controller 20 supplies power to the 24V-line load 35 from both the constant-voltage power supply 30 and the constant-current power supply 26 simultaneously to thereby reduce AC power consumption by the constant-voltage power supply 30, and increases an allocation of power to the fixing power supply 31 to thereby increase an amount of power to be supplied to the fixing heater 36. Hence, reduction of the warm-up time is attained. In this control, the maximum output-current value MCD is set to such a current value (a) that attains a power of a value obtained by subtracting the power allocated to the fixing power supply 31 and the power to be supplied to the 5V-line load 34 from the power value available from the AC power-supply line 27.

Once the temperature of the fixing heater 36 reaches the temperature at which printing is available, a required amount of power to be supplied to the fixing heater 36 for maintaining the temperature is smaller than that required during the fixing-warmup period. However, at a start of printing (2) after the fixing warmup has been completed, a sheet is caused to pass through the fixing heater 36, which lowers the temperature of the fixing heater 36 by a large degree. Therefore, until the temperature is stabilized, the fixing heater 36 must be supplied with a larger amount of power than that supplied during a normal printing period except for the start up period. During the printing operation, activation of a motor and the like increases power consumption by the load 35, which can cause a total amount of power, including the power to be supplied to the fixing heater, to exceed the available power of the AC power-supply line 27. To this end, the power allocation for the fixing power supply 31 is set to be smaller than that in the fixing-warmup period and larger than that during the normal printing period (B: 1200 watts), and a differential between the thus-allocated power and the power during the fixing-warmup period is included in the constant-voltage power supply 30 so that the amount of available power supply for the 24V-line load 35 is increased (b). In other words, the system controller 20 changes the maximum current value MCD (set to be greater than the power value during the fixing-warmup period) and sends the value MCD to the current indicator 64 so that the AC power consumption is suppressed such that the amount of power supplied from the AC power-supply line 27 is smaller than a rated power of the product. Hence, the constant-current power supply 26 supplies the load 35 with power from the constant-voltage power supply 30 of an amount that supplements power insufficiency due to the control of suppressing the AC power consumption to a value close to the maximum value.

The auxiliary power supply has a limitation in power storage capacity, which inhibits consecutive power supply. Hence, when a predetermined duration, after which the fixing temperature is stabilized, has elapsed, the maximum current is set to a large value (b') so that power is supplied to the load 35 only from the constant-voltage power supply, and power supply from the constant-current power supply is stopped. Simultaneously, the amount of power supplied to the fixing heater is changed to an amount (B') for a normal printing period. The period for stabilizing the fixing temperature, during which power supply to the auxiliary power supply is to be stopped, can be set in the form of time or a print count, and can be fixed thereto. When, alternatively, the value for setting the period is variable and based on parameters such as a print sheet size and the room temperature, a period during which power is to be supplied from the auxiliary power supply can be set in response to the fixing-temperature stabilizing period, which is expected to vary depending on an operating mode.

When an error occurs in the load-current detector 33 or the current indicator 64 and prevents to supply power of a required amount from the constant-current power supply 26, the amount of power supplied from the constant-voltage power supply 30 exceeds an expected value. Consequently, the amount of AC power input to equipment exceeds the rated power of the product as shown in the bottom diagram shown in FIG. 6. To prevent such a circumstance, the system controller 20 according to the first embodiment performs error control.

Figure 7:
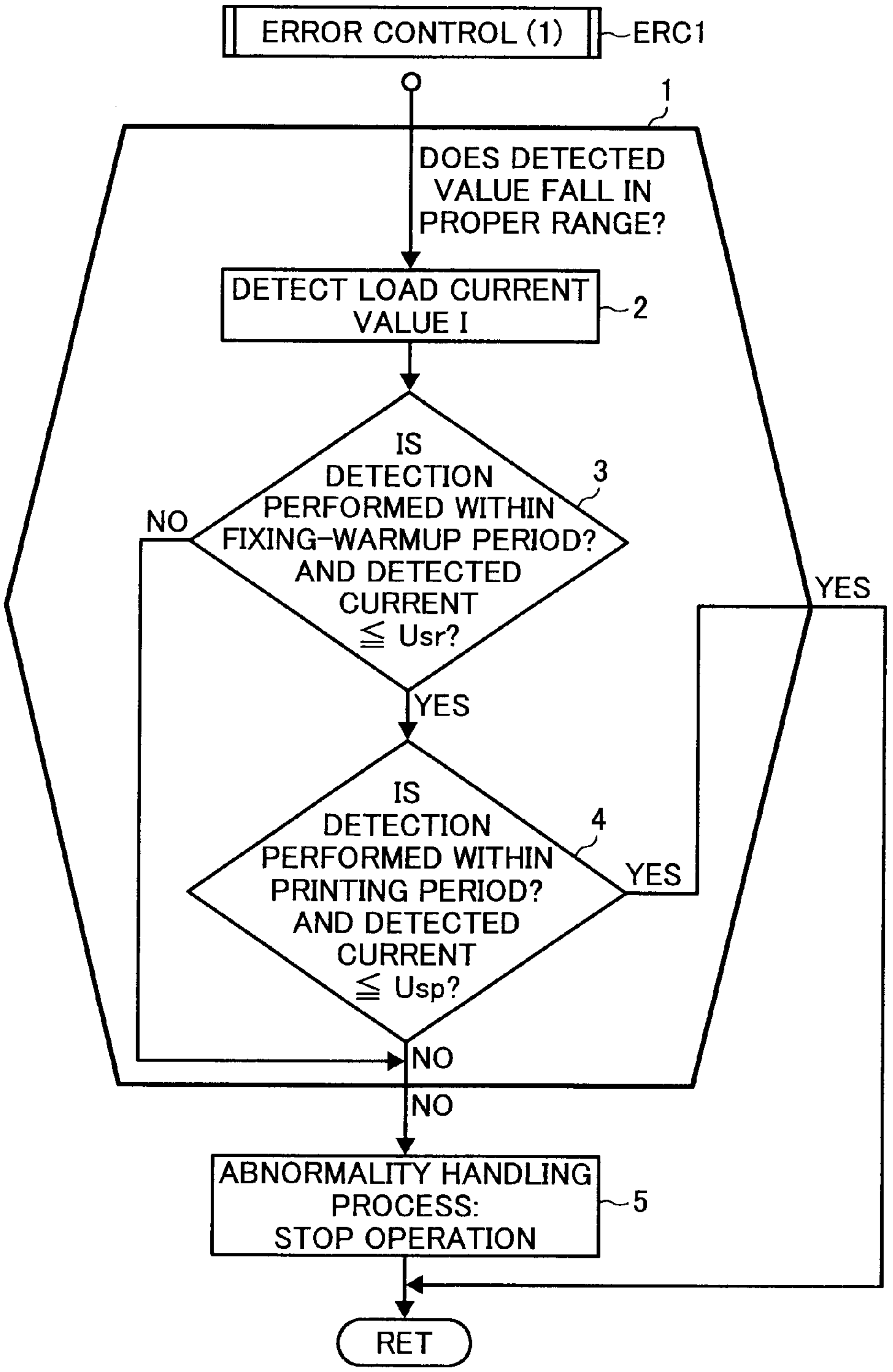
FIG. 7 is a flowchart of an overview of error control performed by the system controller (a central processing unit (CPU)) shown in FIG. 4.

FIG. 7 is an overview of error control ERC1 performed by (the CPU 21 of) the system controller 20 according to the first embodiment. The error control ERC1 is performed at regular intervals (in a fixed cycle) during an operating period of the system; that is, during the fixing-warmup period and the printing period shown in FIG. 6. When the operation of the system ends, the system controller 20 terminates the error control. Upon proceeding to the error control ERC1, the system controller 20 determines whether a detected value falls in a proper range (step 1). At the determining (step 1), a current signal detected by the load-current detector 33 (FIG. 5) is converted into a digital signal and read (step 2). For the fixing-warmup period, the thus-read data on the detected current value is compared with a reference value Usr (step 3). For the printing period, the data is compared with a reference value Usp (step 4). When the detected current value is equal to or smaller than the reference values, the load-current detector 33 is determined to operate properly. When the same exceeds the reference values, the load-current detector 33 is determined to be anomalous. When the load-current detector 33 is determined to be anomalous, the system controller 20 stops the operation of the system, and displays on the operating board 10 that the power supply apparatus has failed. When the abnormality is detected during printing performed in response to an instruction for printing issued via a network or a warm-up period therefor, a notice of the hard error with the copier is transmitted to a host machine (equipment that has issued the printing instruction; e.g., a personal computer PC) via the network (step 5).

As shown in FIG. 6, each of the reference value Usr for the fixing-warmup period and the reference value Usp for the printing period is an overcurrent value higher than the load current (24V-line load current) for the stationary operating period, and provides a power load exceeding the rated power to the AC power supply under a condition in which normal fixing power is consumed. Each reference value is set in a program for the error control ERC1.

Thus, the error control ERC1 detects the load current, and compares the detected value with the reference values Usr and Usp each associated with corresponding operating modes of the apparatus. When the detected value is determined to exceed the reference values Usr and Usp, the system controller 20 determines that an abnormality has been detected, and performs an abnormality-handling process.

Figure 8:
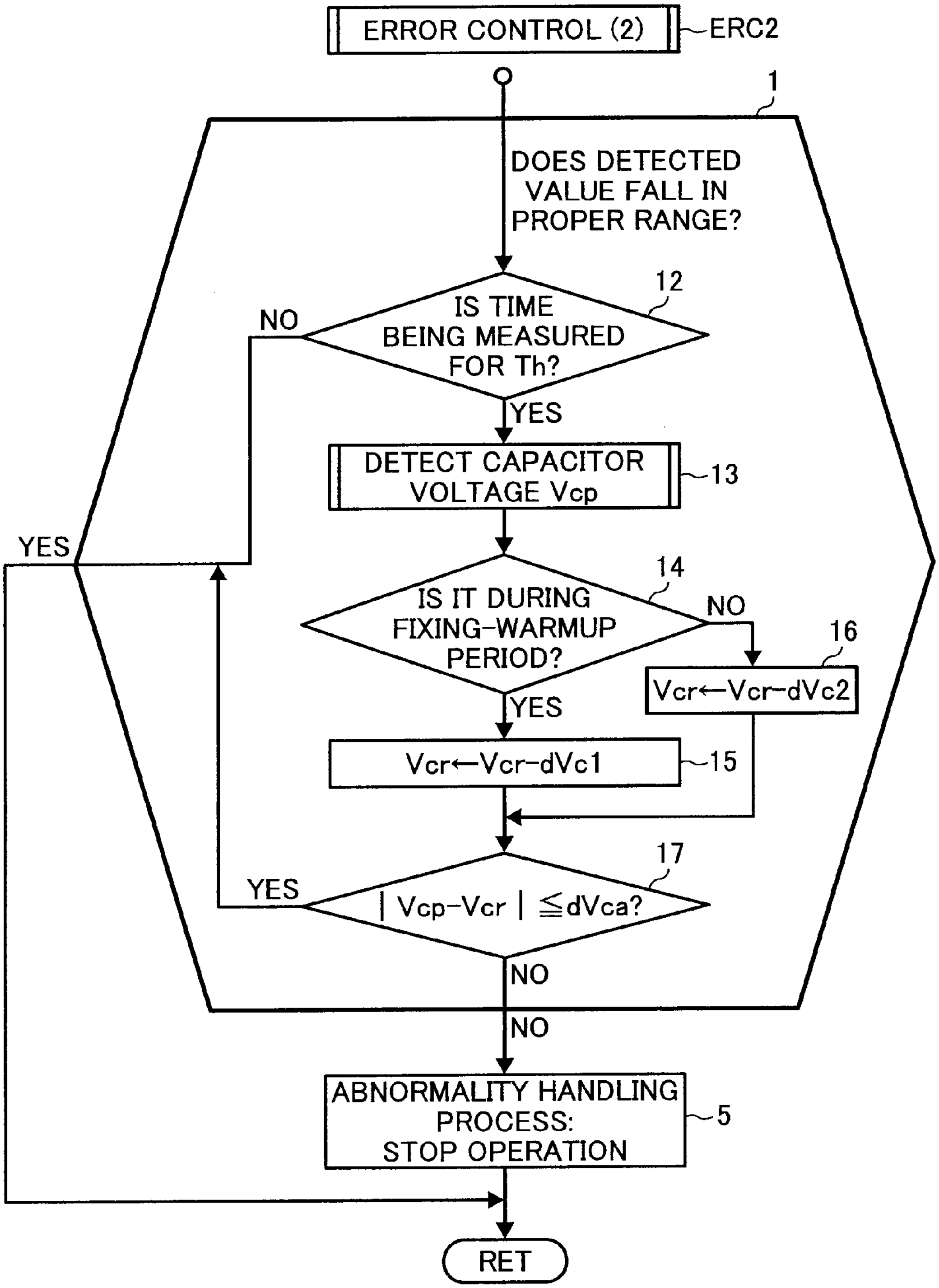
FIG. 8 is a flowchart of an overview of error control performed by the system controller according to a second embodiment of the present invention.

A second embodiment of the present invention is identical with the first embodiment in hardware, but different in error control performed by the system controller 20. FIG. 8 depicts error control ERC2 performed by the system controller 20 according to the second embodiment. Similar to the error control ERC1, the error control ERC2 is performed at regular intervals (in a fixed cycle) during the operating period the system; that is, during the fixing-warmup period and the printing period shown in FIG. 6. When the operation of the system ends, the system controller 20 terminates the error control. Upon proceeding to the error control ERC2, the system controller 20 determines whether a detected value falls in the proper range (step 1). At the determining (step 1), whether time measurement for the time limit Th is being performed (whether power is being supplied to the load 35 from the auxiliary power supply 32) is determined (step 12). When the time measurement for the time limit Th is being performed, a voltage detector 39 detects a voltage at the capacitor 37. The thus-detected signal is converted into a digital signal, and read as capacitor voltage data Vcp (step 13). Subsequently, a capacitor voltage at the present time is estimated through calculation. During the fixing-warmup period, the capacitor voltage is calculated based on a capacitor voltage drop dVc1, which is a voltage drop over a first cycle of the error control ERC2 under a normal condition (step 15). During the printing period, the same calculation is performed based on a capacitor voltage drop dVc2, which is a voltage drop over a first cycle of the error control ERC2 under a normal condition (step 16). An initial value of a calculated estimation value Vcr is a capacitor voltage detected at the start of the time measurement for the time limit Th.

Whether an absolute deviation of the detected value Vcp from the calculated estimation value Vcr of the capacitor voltage falls within an allowable range dVca is determined (step 17). When the absolute deviation falls within the range dVca, the load-current detector 33 determines the apparatus to operate properly. When the same exceeds the range dVca, the load-current detector 33 is determined to be anomalous. When the load-current detector 33 is determined to be anomalous, the system controller 20 stops an operation of the system, and displays on the operating board 10 that the power supply apparatus has failed. When the abnormality is detected during printing performed in response to an instruction for printing issued via a network or a warm-up period therefor, a notice of the hard error with the copier is transmitted to a host machine (equipment that has issued the printing instruction; e.g., a personal computer PC) via the network (step 5).

Thus, the system controller 20 according to the embodiment detects a residual power (in the example, the capacitor voltage at the voltage detector 39) in the capacitor 37, and calculates an estimated value of the residual power based on a decrease (in the configuration, a drop rate in the capacitor voltage at the voltage detector 39) in the accumulated power. The decrease is conjectured based on an operating mode of the apparatus. The system controller 20 compares the detected power value with the estimated value, and, when its difference is equal to or greater than a predetermined value, determines that an abnormality has been detected, and performs an abnormality-handling process.

Figure 9:
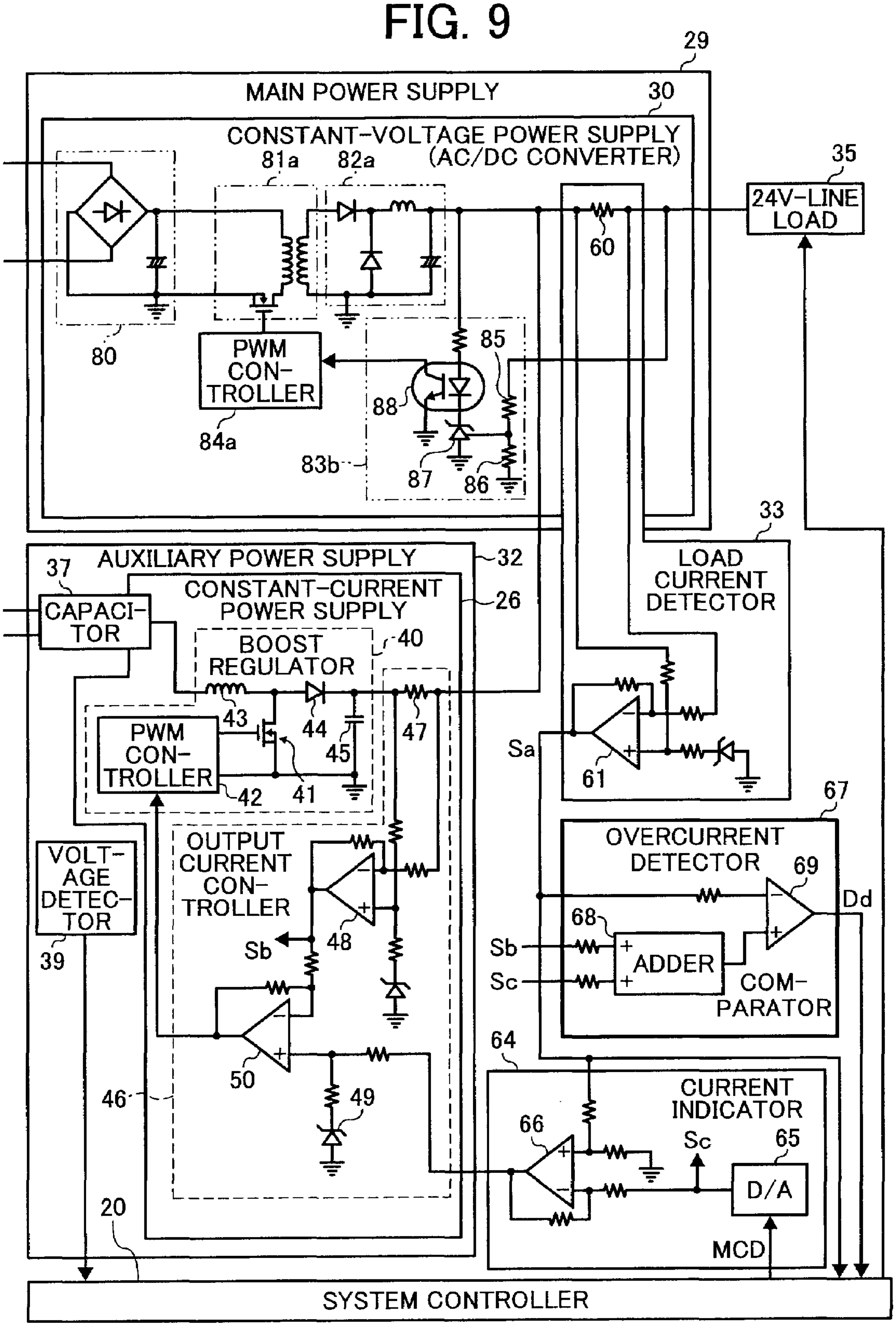
FIG. 9 is a block diagram of a configuration of a power supply apparatus according to a third embodiment of the present invention.

A third embodiment of the present invention is essentially identical with the first embodiment in hardware, but different in hardware of the power supply apparatus. FIG. 9 depicts a configuration of a power supply apparatus according to the third embodiment. The power supply apparatus additionally includes an overcurrent detector 67. An adder 58 in the overcurrent detector 67 receives a detected current signal Sb that represents an output current value of the constant-current power supply 26 and a maximum-current value indicating signal Sc that represents the indicated maximum current value MCD for the constant-voltage power supply 30. A sum of the signals Sb and Sc is supplied to a comparator 69. The comparator 69 further receives a detected load current signal Sa that represents a load current detected by the load-current detector 33. Within a period during which the power supply apparatus operates properly, relation between the signals is expressed as: Sa−Sc=Sb; put another way, Sa=Sb+Sc. Accordingly, when the relation is expressed as Sa>Sb+Sc, the apparatus is in an abnormal condition. When Sa is equal to or greater than the sum of Sb and Sc and a tolerance α(Sb+Sc+α), the comparator 69 switches a binary output signal Dd from a high "H" level indicating a normal condition, to a low "L" level indicating an abnormal condition.

Figure 10:
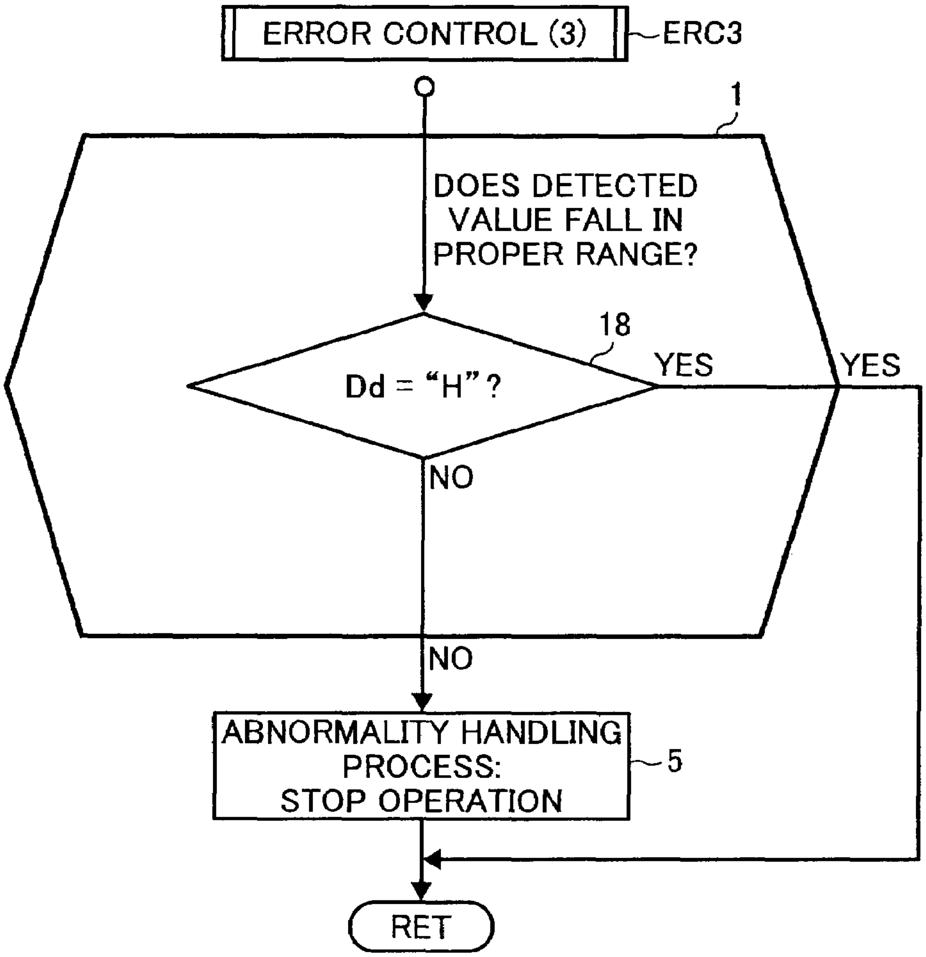
FIG. 10 is a flowchart of an overview of error control performed by the system controller according to the third embodiment.

FIG. 10 depicts error control ERC3 performed by the system controller 20 according to the third embodiment. The process to be performed at step 5 of the error control ERC3 is interrupt handling to be performed in response to the switching of the binary output signal Dd in the comparator 69 from H to L. More specifically, when the binary output signal Dd in the comparator 69 is switched to L that indicates an anomalous condition due to an abnormality of the load current detector, the current indicator 64 or an output-current controller 46, or other circuit element; that is, when the overcurrent detector 67 detects an anomalous condition, the system controller 20 performs the interrupt handling "abnormality-handling process: stop operation" (step 5), stops the operation of the system, and displays on the operating board 10 that the power supply apparatus has failed. When the error is detected during printing in response to a command for printing via a network or warm-up period therefor, a notice of the hard error with the copier is transmitted to a host machine (equipment that has issued the printing command; e.g., a personal computer PC) via the network.

Figure 11:
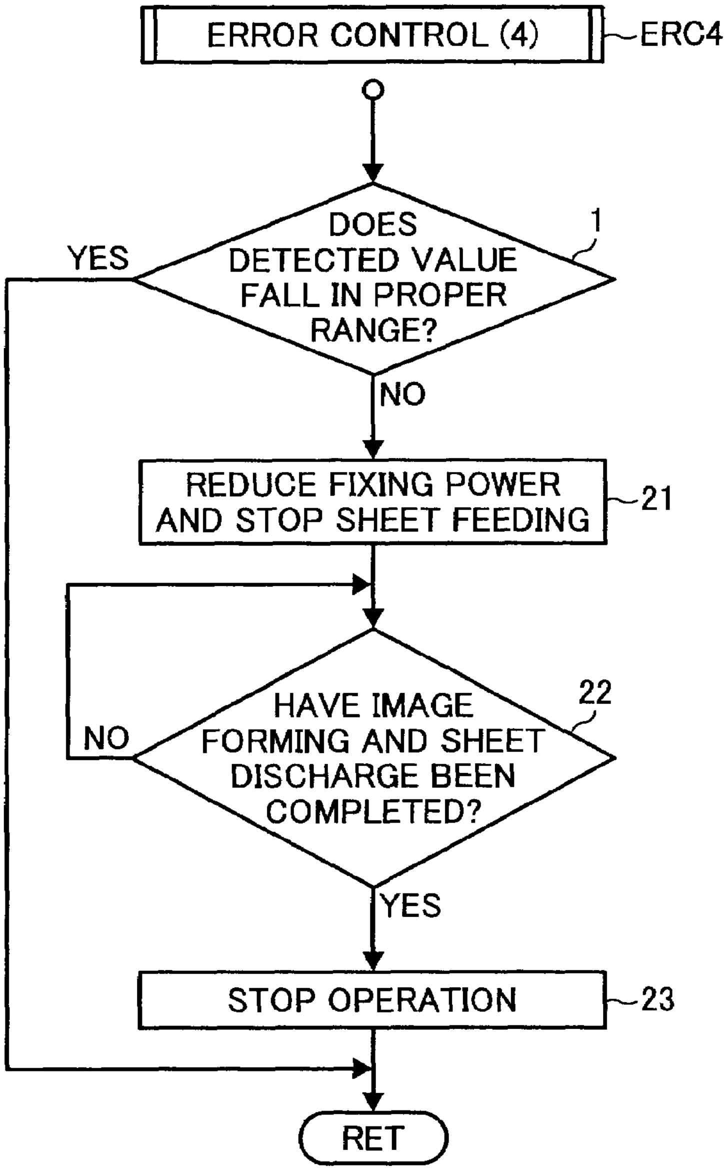
FIG. 11 is a flowchart of an overview of error control performed by a system controller according to a first modification of the present invention.

In any one of the first to the third embodiments, when an abnormality is detected at the determining (step 1), an operation of the copier is immediately stopped (step 5). On the other hand, as shown in FIG. 11, when an abnormality is detected at the determining (step 1), the system controller 20 of a first modification lowers the indicated fixing-power value for the fixing power supply 31 to a corresponding one of levels (A) and (B) indicated by dotted lines in FIG. 6, and stops sheet feeding after a currently-fed recording sheet(s) has been processed. In other words, feeding of an additional recording sheet is not performed. After imaging and sheet discharge of the already-fed recording sheet(s) is completed (step 22), the operation of the system is stopped (step 23). Thus, even when the output current value from the constant-voltage power supply 30 increases due to an abnormality, the fixing power is lowered from A to (A) and from B to (B). Hence, application of overload to the input AC-power supply can be avoided or suppressed. The detail of the determining (step 1) of FIG. 11 is depicted in FIG. 7, 8, or 10.

Figure 12:
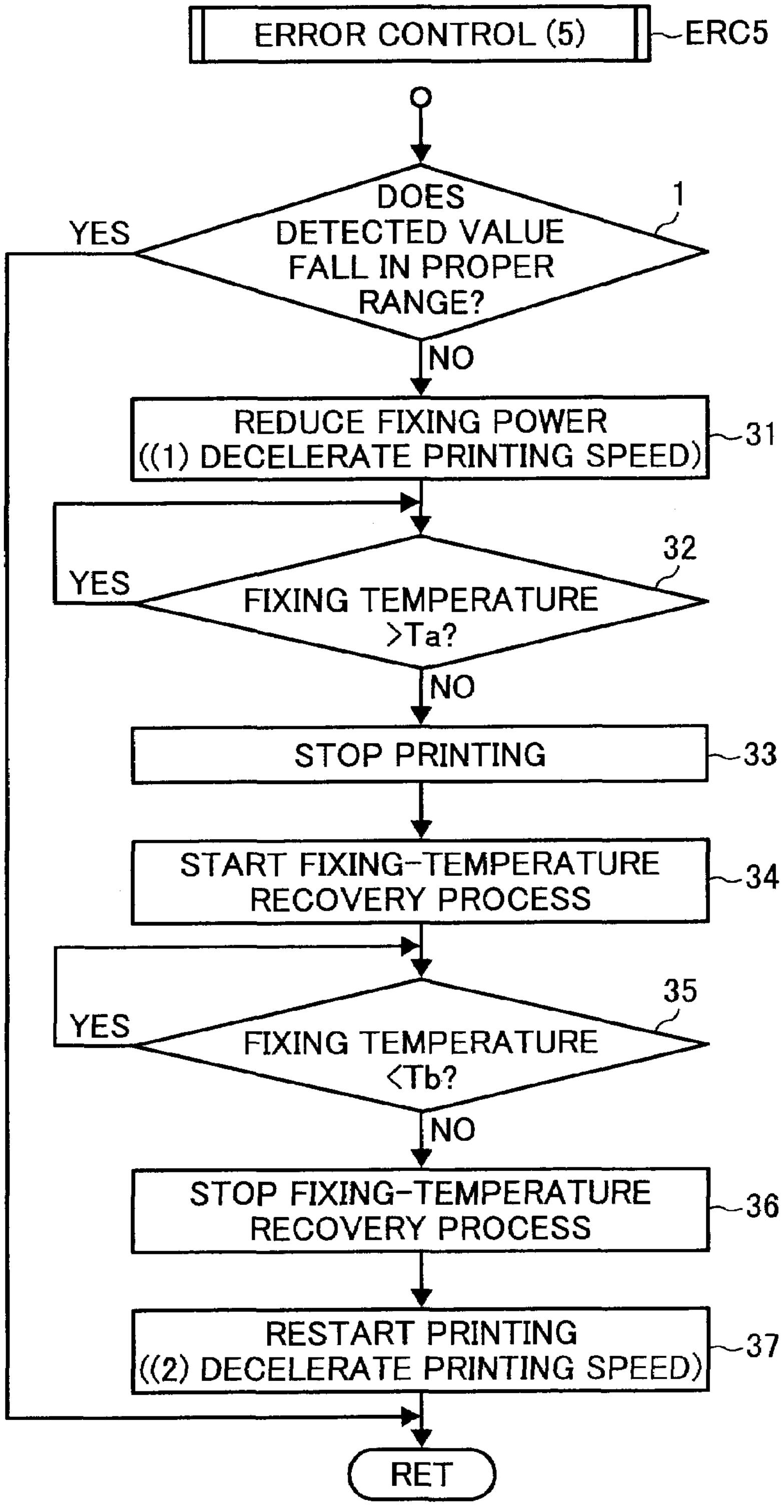
FIG. 12 is a flowchart of an overview of error control performed by a system controller according to a second modification of the present invention.

As shown in FIG. 12, when an abnormality is detected at the determining (step 1), the system controller 20 of a second modification lowers the indicated fixing-power value to a corresponding one of levels (A) and (B) (step 31). When the temperature of the fixing heater 36 decreases to be equal to or lower than a temperature Ta near the minimum temperature for fixation (step 32), the system controller 20 stops sheet feeding after a currently-being-fed recording sheet(s) has been processed (step 33). After image forming on an already-fed recording sheet is completed and the sheet has been discharged, a fixing-temperature recovery process is performed (step 34). When the temperature of the heater has risen to a predetermined value Tb or higher (step 35), printing is re-started (step 36). At the time of reducing the fixing power (step 31), or re-starting printing (step 37), the system controller 20 decelerates a printing speed. Decelerating the printing speed lowers the temperature of the heater, thereby delaying a timing of moving to the fixing-temperature recovery process (step 34). In a mode, such as a scanner operation, in which a fixing device is not used, the temperature of the heater does not drop to Ta or lower, which allows to use the copier as usual.

As described above, according to the second modification, the system controller 20 decreases the indicated fixing-power value. When the temperature of the heater falls to a minimum value at which fixation of an image is available or lower based on temperature detection performed by the temperature detector 70 of the fixing heater 36, image forming on a currently-being-printed recording sheet is performed, and after the sheet has been discharged, the apparatus is stopped. When the temperature does not drop to the value, the apparatus continues its operation. Since a typical thermal fixing unit has a certain thermal capacitance, even when power is shut down or reduced in amount, the temperature of the fixing unit does not drop immediately. In a mode, such as a scanner operation, in which a fixing device is not used, the apparatus is maintained to be operable. In a printing mode, the indicated fixing-power value is similarly decreased, and the apparatus is maintained to be operable by decelerating a printing speed and setting a fixing-temperature recovery period. This allows the power consumption not to exceed an available amount.

An abnormality of simultaneously-supplied power due to a failure in the current detector (33) or the like is detected. This allows to prevent a secondary damage that can otherwise be caused by a voltage drop in commercial power or the like.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply apparatus comprising:

a first power supply that outputs a constant voltage using an externally supplied power as an input source;

a second power supply that outputs a constant current using a power charged in a capacitor as an input source;

a circuit unit that connects an output from the first power supply and an output from the second power supply in parallel, and simultaneously supplies a power from the first power supply and a power from the second power supply to a load;

a current detector that detects a current supplied to the load;

a control unit that controls an output current from the first power supply to equal to or lower than an upper-limit value, and controls an output current from the second power supply to a value obtained by subtracting the upper-limit value from the current detected by the current detector;

a residual power detector that detects a residual power of the capacitor; and an abnormality detector that estimates the residual power of the capacitor according to an operating state of the power supply apparatus and detects an abnormality in simultaneously supplied power, based on detected residual power and estimated residual power.

2. A power supply apparatus comprising:

a first power supply that outputs a constant voltage using an externally supplied power as an input source;

a second power supply that outputs a constant current using a power charged in a capacitor as an input source;

a circuit unit that connects an output from the first power supply and an output from the second power supply in parallel, and simultaneously supplies a power from the first power supply and a power from the second power supply to a load;

a first current detector that detects a current supplied to the load;

a control unit that controls an output current from the first power supply to equal to or lower than an upper-limit value, and controls an output current from the second power supply to a value obtained by subtracting the upper-limit value from the current detected by the current detector;

a second current detector that detects the output current from the second power supply; and an abnormality detector that detects an abnormality in simultaneously supplied power, based on the output current from the second power supply detected by the second current detector, the upper-limit value, and the current detected by the first current detector.

3. An image forming apparatus comprising:

an image forming unit that forms an image on a recording medium;

a fixing unit that heats the recording medium on which the image is formed, using a heater;

a power supply unit that supplies a power to the heater of the fixing unit;

the power supply apparatus according to claim 1, which supplies a power to a load of the image forming unit; and a system controller that reduces, when the power supply apparatus detects the abnormality, an amount of power to be supplied from the power supply unit to the fixing unit, and continues an image forming process of forming the image on the recording medium.

4. The image forming apparatus according to claim 3, wherein when the power supply apparatus detects the abnormality, the system controller outputs a notice of the abnormality.

5. The image forming apparatus according to claim 3, wherein when the power supply apparatus detects the abnormality, the system controller transmits information on the abnormality to a network to which the image forming apparatus is connected.

6. An image forming apparatus comprising:

an image forming unit that forms an image on a recording medium;

a fixing unit that heats the recording medium on which the image is formed, using a heater;

a power supply unit that supplies a power to the heater of the fixing unit;

the power supply apparatus according to claim 1, which supplies a power to a load of the image forming unit; and a system controller that reduces, when the power supply apparatus detects the abnormality, an amount of power to be supplied from the power supply unit to the fixing unit, and suspends a start of forming an image on a next recording medium after forming the image on a current recording medium.

7. The image forming apparatus according to claim 6, wherein when the power supply apparatus detects the abnormality, the system controller outputs a notice of the abnormality.

8. The image forming apparatus according to claim 6, wherein when the power supply apparatus detects the abnormality, the system controller transmits information on the abnormality to a network to which the image forming apparatus is connected.

9. An image forming apparatus comprising:

an image forming unit that forms an image on a recording medium;

a fixing unit that heats the recording medium on which the image is formed, using a heater;

a temperature detecting unit that detects a heating temperature of the fixing unit;

a power supply unit that supplies a power to the heater of the fixing unit;

the power supply apparatus according to claim 1, which supplies a power to a load of the image forming unit; and a system controller that reduces, when the power supply apparatus detects the abnormality, an amount of power to be supplied from the power supply unit to the fixing unit, and if the heating temperature detected by the temperature detecting unit is equal to or lower than a predetermined value, suspends a start of forming an image on a next recording medium after forming the image on a current recording medium.

10. The image forming apparatus according to claim 9, wherein when the power supply apparatus detects the abnormality, the system controller outputs a notice of the abnormality.

11. The image forming apparatus according to claim 9, wherein when the power supply apparatus detects the abnormality, the system controller transmits information on the abnormality to a network to which the image forming apparatus is connected.

* * * * *